United States Patent
Melikyan et al.

(10) Patent No.: US 10,295,741 B2
(45) Date of Patent: May 21, 2019

(54) SINGLE MODE GRATING COUPLER WITH VERTICAL COUPLING DIRECTION AND SMALL BACK REFLECTION

(71) Applicant: Nokia Solutions and Networks Oy, Espoo (FI)

(72) Inventors: Argishti Melikyan, Murray Hill, NJ (US); Young-Kai Chen, Murray Hill, NJ (US); Po Dong, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/476,607

(22) Filed: Mar. 31, 2017

(65) Prior Publication Data
US 2018/0284343 A1 Oct. 4, 2018

(51) Int. Cl.
G02B 6/12 (2006.01)
G02B 6/124 (2006.01)
G02B 6/42 (2006.01)
G02B 6/30 (2006.01)

(52) U.S. Cl.
CPC .......... *G02B 6/124* (2013.01); *G02B 6/30* (2013.01); *G02B 6/4214* (2013.01); *G02B 2006/12107* (2013.01)

(58) Field of Classification Search
CPC ........ G02B 6/124; G02B 6/30; G02B 6/4214; G02B 2006/12107
USPC ........................................................... 385/14
See application file for complete search history.

(56) References Cited

U.S. PATENT DOCUMENTS

| | | | |
|---|---|---|---|
| 6,285,813 B1 | 9/2001 | Schultz et al. | |
| 7,245,803 B2 | 7/2007 | Gunn, III et al. | |
| 2007/0003180 A1* | 1/2007 | Tanaka | G02F 1/0327 385/2 |
| 2009/0146081 A1* | 6/2009 | Stark | B82Y 20/00 250/492.2 |
| 2015/0309261 A1 | 10/2015 | Kobyakov et al. | |

(Continued)

FOREIGN PATENT DOCUMENTS

EP 2703858 A1 3/2014

OTHER PUBLICATIONS

Van Laere, et al.; "Compact and Highly Efficient Grating Couplers Between Optical Fiber and Nanophotonic Waveguides"; Journal of Lightwave Technology; vol. 25 Issue 1; IEEE Aerospace and Electronic Systems Society; Jan. 2007; 1 pg.

*Primary Examiner* — Jerry M Blevins

(57) ABSTRACT

An optical apparatus comprising an optical device having an optical input-output face, at least two planar waveguide arms being located on a substrate, an optical splitter being located on the substrate, and, an optical grating coupler being located on the substrate. The optical splitter has an optical input and a plurality of optical outputs, each optical output being optically connected to a corresponding one of the planar waveguide arms. The optical grating coupler is connected to receive light from each planar waveguide arm and form diffraction pattern therefrom such that a principal maximum of one of the diffraction patterns overlaps with a principal maximum of another of the diffraction patterns on the optical input-output face of the optical device, the principal maxima of the one and another of the diffraction patterns being directed in different directions.

14 Claims, 16 Drawing Sheets

(56) References Cited

U.S. PATENT DOCUMENTS

2016/0109659 A1  4/2016  Jiang
2016/0246009 A1* 8/2016  Jiang ..................... G02B 6/124

* cited by examiner

SINGLE MODE GRATING COUPLER WITH VERTICAL COUPLING DIRECTION AND SMALL BACK REFLECTION

TECHNICAL FIELD

The invention relates, in general, to an optical apparatus having optical couplers and, more specifically, to vertical optical couplers in a photonic integrated circuit apparatus, and methods of manufacturing such apparatuses.

BACKGROUND

This section introduces aspects that may help facilitate a better understanding of the inventions. Accordingly, the statements of this section are to be read in this light and are not to be understood as admissions about what is prior art or what is not prior art.

Vertical optical grating couplers are often used to diffract light largely vertically from a silicon photonic chip to free space so that the light may be collected at an end of a single mode optical fiber located above the grating coupler. Typically, to avoid back reflection into the waveguide, the fiber is tilted to have an off-normal angle, and the grating coupler is designed to have a correspondingly aligned off-normal radiation angle. The use of such off-normal tilt angles, however, presents difficulties with device packaging and requires two angular alignments. Efforts to improve the match between the off-normal radiated field and mode of the tilted single mode fiber by apodizing the grating elements can present fabrication challenges related to reproducibly matching the Gaussian mode of a single mode optical fiber. The optical coupling efficiency can be improved by placing a mirror above or below the grating coupler to reflect light into the fiber, but, there are challenges to construct a mirror that reflects light with an off-normal radiation angle to enable efficient coupling to the end of such a tilted single mode optical fiber.

SUMMARY

One embodiment is an optical apparatus comprising an optical device having an optical input-output face, at least two planar waveguide arms being located on a substrate, an optical splitter being located on the substrate and an optical grating coupler being located on the substrate. The optical splitter has an optical input and a plurality of optical outputs, each optical output being optically connected to a corresponding one of the planar waveguide arms. The optical grating coupler is connected to receive light from each planar waveguide arm and form diffraction pattern therefrom such that a principal maximum of one of the diffraction patterns overlaps with a principal maximum of another of the diffraction patterns on the optical input-output face of the optical device, the principal maxima of the one and another of the diffraction patterns being directed in different directions.

In some such embodiments, a first of the planar waveguide arms can be configured to propagate light along the optical grating coupler in an opposite direction than a second of the planar waveguide arms. In some such embodiments, the overlapping principal maxima can be first order principal maxima of the one and another of the diffraction patterns. In some embodiments, only one principal maximum of the one and another of the diffraction patterns can be incident on the optical input-output face of the optical device. In some such embodiments, the overlapping principal maxima can have a peak at or near a center of the optical input-output face. In some such embodiments, the diffraction patterns can combine to form an intensity pattern with one peak on the optical input-output face of the optical device. In some such embodiments, the diffraction patterns can combine to form an intensity pattern with a single substantially Gaussian shaped field strength distribution centered above and below the optical grating coupler. In some such embodiments, the optical device can bean optical fiber and the optical input-output face can be an end of the fiber. In some such embodiments, the diffraction patterns can combine to form an intensity pattern with a shape and numerical aperture that maximizes optical coupling efficiency to a single mode size of the optical device. In some such embodiments, the optical device can have a single mode size diameter in a range from 3 to 15 microns and the optical grating coupler, composed of silicon and surrounded by a silicon oxide cladding, includes a set of equally spaced ridges across one dimension of the substrate, wherein the ridges has a periodicity in a range from 0.4 to 2.0 microns and a spacing in a range from 0.1 to 1.9 microns.

Any such embodiments can further include an optical phase shifter optically coupled to one of the waveguide arms, the optical phase shifter configured to adjust a phase of the portion of the optical output directed through the one waveguide arm. Any such embodiments can further include an optical phase shifter optically coupled to one of the waveguide arms, the optical phase shifter configured to adjust the phase of the portion of the optical output directed through the one waveguide arm such that the optical output portions directed to the optical grating coupler combine to produce the diffraction patterns with an intensity pattern with a single substantially Gaussian shaped field strength distribution having a peak intensity in a plane parallel to but perpendicularly off-set from a major plane of the optical grating coupler. Any such embodiments can further include a phase control module located on the optical system package substrate and coupled via electrodes on the substrate to an optical phase shifter located on the substrate and optically coupled to one of the waveguide arms. For any such embodiments, the substrate can be a photonic integrated circuit substrate mounted to an optical system package support substrate.

Another embodiment is another optical apparatus comprising an optical grating coupler located on a substrate and two or more waveguide arms on the substrate. The optical grating coupler can be configured to produce a vertical propagation optical signal in a region above and below a major plane of the optical grating coupler. The waveguide arms can each be configured to couple equal portions of a split optical signal with the optical grating coupler. Each of the portions of the split optical signal when directed to the optical grating coupler can produce vertical propagation optical signals with an acute off-normal radiation angle.

In some such embodiments, the optical signal portions directed to the optical grating coupler can combine to produce the vertical propagation optical signal with a single substantially Gaussian shaped field strength distribution centered above and below the optical grating coupler. In some such embodiments the optical grating coupler can be a one-dimensional grating coupler while in other such embodiments, the optical grating coupler can be a two-dimensional grating coupler. In some such embodiments, the two or more waveguide arms can be coupled to a single waveguide on the substrate, the single waveguide configured to carry the split optical signal. In some such embodiments, ends of the two or more waveguide arms can be tapered from a width equal to a width of the optical grating coupler to a width equal to a width of non-tapered portions of the waveguide arms.

Any such embodiments can further include a mirror having a reflective surface facing and parallel to the major plane of the optical grating coupler. Any such embodiments can further include an optical device having an optical input-output face located in a region centered over or under the optical grating coupler. The optical device can be configured to receive the vertical propagation optical signal from the optical grating coupler, or, to transmit a single mode optical signal to the region above and below the major plane. In some such embodiments, the optical grating coupler can be configured to produce the vertical propagation optical signal with a shape and numerical aperture that maximizes optical coupling efficiency to a single mode size of an optical device. In some such embodiments the optical device can have a single mode size diameter in a range from 3 to 15 microns and the optical grating coupler, composed of silicon and surrounded by a silicon oxide cladding, can include a set of equally spaced ridges across one dimension of the substrate, wherein the ridges has a periodicity in a range from 0.4 to 2.0 microns and a spacing in a range from 0.1 to 1.9 microns.

Any such embodiments can further include an optical phase shifter optically coupled to one of the waveguide arms. The optical phase shifter can be configured to adjust a phase of the portion of the split optical signal directed through the one waveguide arm. The optical phase shifter can be configured to adjust the phase of the portion of the split optical signal such that the optical signal portions directed to the optical grating coupler combine to produce the vertical propagation optical signal with a single substantially Gaussian shaped field strength distribution having a peak intensity in a plane parallel to but perpendicularly off-set from the major plane.

In any such embodiments, the substrate can a photonic integrated circuit substrate mounted to an optical system package support substrate.

Another embodiment is a method fabricating a vertical optical coupling apparatus, including providing a substrate, providing an optical layer on the substrate and patterning the optical layer. The optical layer is patterned to form an optical grating coupler and at least two waveguide arms optically coupled to the optical grating coupler. The waveguide arms are each configured to connect a split optical output to the optical grating coupler. The optical grating coupler is connected receive light from each of the waveguide arms and form diffraction pattern therefrom such that a principal maximum of one of the diffraction patterns overlaps with a principal maximum of another of the diffraction patterns on the optical input-output face of the optical device, the principal maxima of the one and another of the diffraction patterns being directed in different directions.

Another embodiment is another method comprising fabricating a vertical optical coupling apparatus. Fabricating the apparatus can include providing a substrate, providing an optical layer on the substrate and patterning the optical layer to form an optical grating coupler and two or more waveguide arms optically coupled to the optical grating coupler. The optical grating coupler can be configured to produce a vertical propagation optical signal in a region above and below a major plane of the optical grating coupler. The two or more waveguide arms can each be configured to couple equal portions of a split optical signal with the optical grating coupler. Each of the portions of the split optical signal when directed to the optical grating coupler can produce vertical propagation optical signals with an acute off-normal radiation angle relative to the major plane of the optical grating coupler.

In some such embodiments, the substrate can include a handle layer and a first cladding layer on the handle layer with the optical layer located on the first cladding layer and fabricating the apparatus can further include depositing a second cladding layer on the optical grating coupler and the two or more waveguide arms.

Any such embodiments can further include depositing a reflective material on an outer surface of the second cladding layer, or, in an opening of the second cladding layer to form a mirror having a planar reflective surface facing, and parallel to, the major plane of the optical grating coupler.

Any such embodiments can further include forming an opening in the substrate and positioning an optical input-output of an optical device in the opening of the substrate. The optical input-output can be located in a region centered under the optical grating coupler. The optical device can be configured to receive the vertical propagation optical signal from the optical grating coupler, or, to transmit a single mode optical signal to the region above and below the major plane.

Any such embodiments can further include mounting an optical system package support substrate to the substrate and forming a opening in the optical system package support substrate and positioning an optical input-output of an optical device in the opening of the optical system package support substrate. The optical input-output can be located in a region centered over the optical grating coupler, and, the optical device can be configured to receive the vertical propagation optical signal from the optical grating coupler, or, transmit a single mode optical signal to the region.

Any such embodiments can further include forming an opening in the substrate and depositing a reflective material in the opening of the substrate to form a mirror having a planar reflective surface facing and parallel to the major plane of the optical grating coupler.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

In the Figures and text, similar or like reference symbols indicate elements with similar or the same functions and/or structures.

Figure 1:
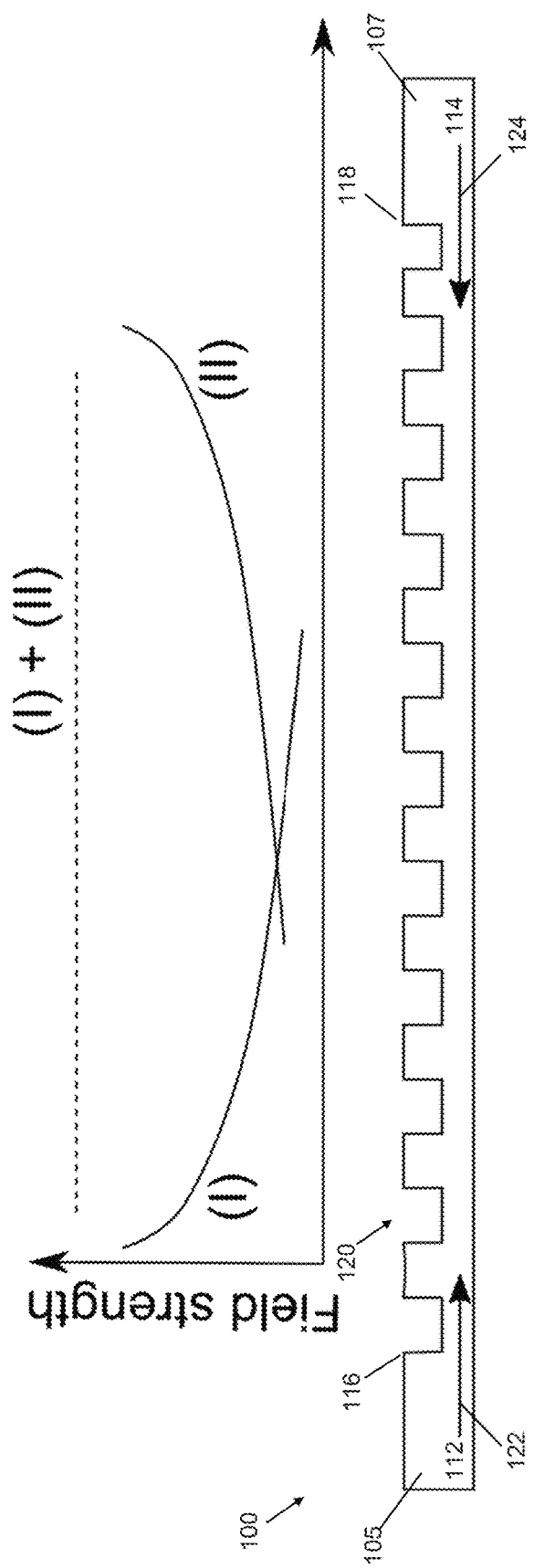
FIG. 1 illustrates radiated field distribution curves (I and II) for an example optical apparatus of the disclosure in which two waveguides couple optical signal to both sides of an optical grating so that the combined optical signal vertically projected by the optical grating has a close to uniform field distribution curve (I+II)

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

As part of the present disclosure, we have recognized that the shape of the radiated field distribution of previous vertical optical grating couplers, e.g. configured to have off-normal radiation angles, is often poorly matched to the distribution mode of the single mode fiber, resulting in sub-optimal vertical optical coupling efficiency. In contrast, the shapes of the radiated field distribution of the vertical optical grating couplers of the present disclosure are adjusted to provide off-normal radiation angles that can substantially match a single mode distribution. The vertical optical grating couplers of the present disclosure are optically coupled to two or more waveguide arms, with each arm configured to connect or couple an optical output (e.g., equal portions of a split optical signal) to the optical grating coupler. The optical signal portions, when projected through the grating coupler with off-normal radiation angles, can be combined to produce substantially vertical propagating optical signals whose radiated field distribution has a shape that substantially matches that of the distribution of a propagating mode at the end of a single mode optical fiber.

As further illustrated by the example embodiments below, the resulting combined optical signal can be perpendicularly projected through the grating coupler to an optical fiber, or another optical device, that is substantially perpendicularly oriented relative to the grating coupler to provide for low back reflection. The ability to use a substantially perpendicular orientation simplifies the packaging of the fiber, or other optical device, either above or below the optical grating.

FIGS. 1-3B illustrate radiated field distribution curves for example optical apparatuses 100 of the disclosure that includes dual waveguide arms 105, 107 connected or coupled to direct optical output (e.g., equal portions of an optical signal such as optical signal portions 112, 114) to opposite ends 116, 118 of an optical grating coupler 120, (e.g., a bilaterally symmetric grating).

As illustrated by the radiated field distributions curves (e.g., curves I and II) in FIG. 1, there is an exponentially decreasing strength of the optical radiation for the individual optical signal portions 112, 114 as they travel from the waveguide arms 105, 110 across the grating coupler 120 in their respective opposite directions 122, 124. E.g., the optical power in the signal portions 112,114, and therefore, the vertically diffracted fields are maximum as the optical signals portions 112, 114 enter the grating coupler 120 and the vertically diffracted field become smaller as the signal portions 112, 114 propagate along the length of the grating coupler 120. However, the two signal portions 112, 114 can combine to produce vertical propagation optical signals having a radiated field distribution curve (e.g., curve I+II) with a substantially constant field strength across the grating coupler 120.

As further illustrated in FIG. 2, the grating coupler 120 can be configured to receive the optical signal portions 112, 114 (e.g., optical outputs from a splitter) and produce vertically propagating optical signals 210 (e.g., form diffraction patterns), via optical diffraction, in regions above and/or below a major plane 220 of the optical grating coupler 120. Each of the vertical propagating optical signals 210 (e.g., diffraction patterns), which are made by diffraction of the oppositely propagating light signals 112, 114, in the grating coupler 120 has an off-normal radiation angle 230. E.g., a principal maximum of one of the diffraction patterns overlaps with a principal maximum of another of the diffraction patterns on the optical input-output face of the optical device, the principal maxima of the one and another of the diffraction patterns being directed in different directions.

The term radiation angle 230 of an optical grating, as used herein means, a direction of a first order of principal maximum of the optical grating for optical signals 210 delivered to the grating by a planar optical waveguide in contact with said optical grating. In some embodiments herein, the first order principle maxima of the grating coupler 120 with respect to light delivered by the waveguide arms 105, 107 are at acute angles relative to a normal to the major plane 220 of the grating coupler 120. For instance, in some embodiments, the angle 230 has a value in a range from about +1 to +45 degrees and from about −1 to −45 degrees, or in some embodiments, a range from about +2 to +15 degrees and from about −2 to −15 degrees, or in some embodiments, in a range from about +3 to +7 degrees and about −3 to −7 degrees.

Figure 2:
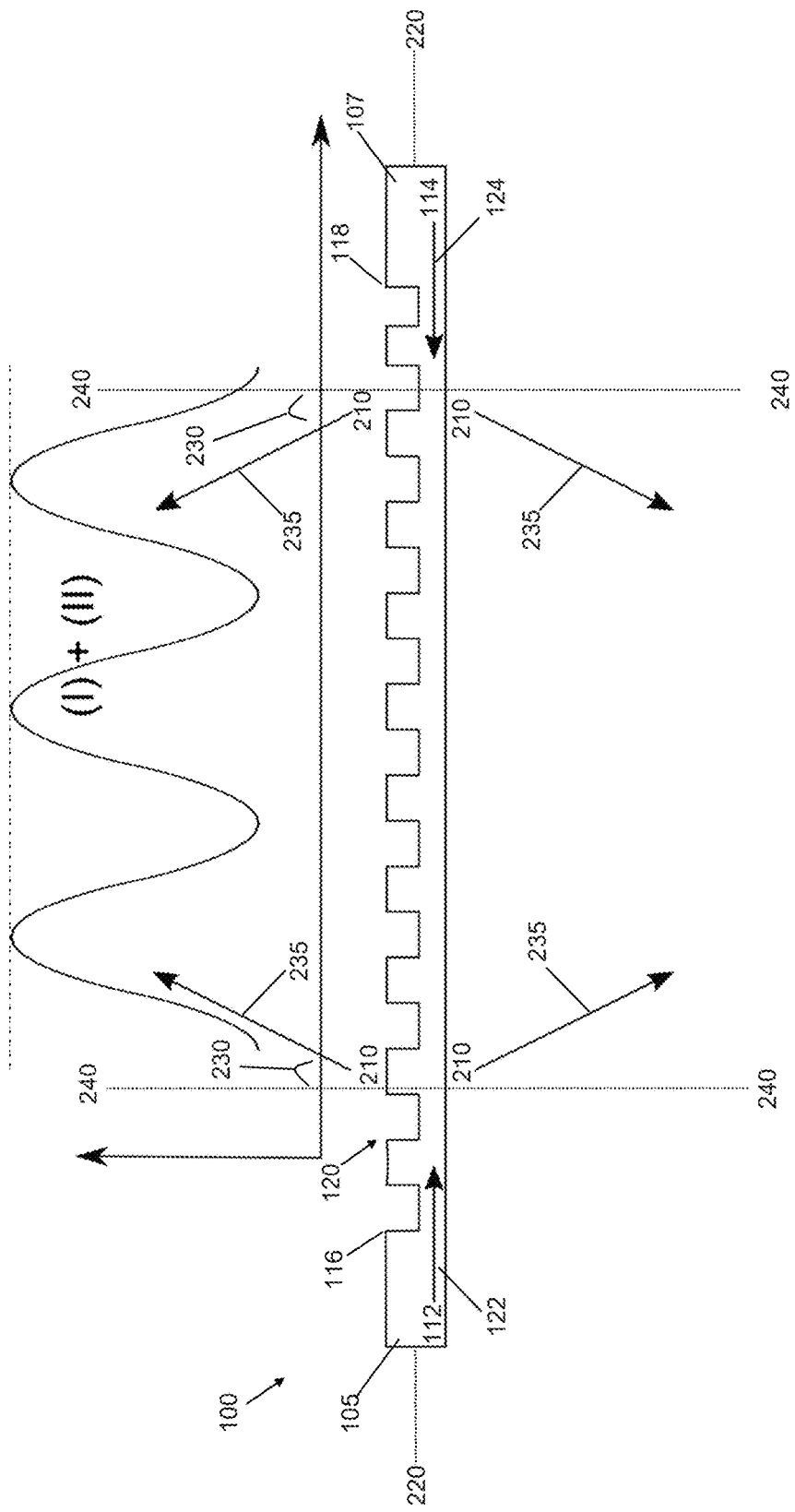
FIG. 2 illustrates a radiated field distribution curve for the example optical apparatus shown in FIG. 1 where the vertically projected optical signals have a cosine-shaped field distribution curve (I+II)
Figure 3A:
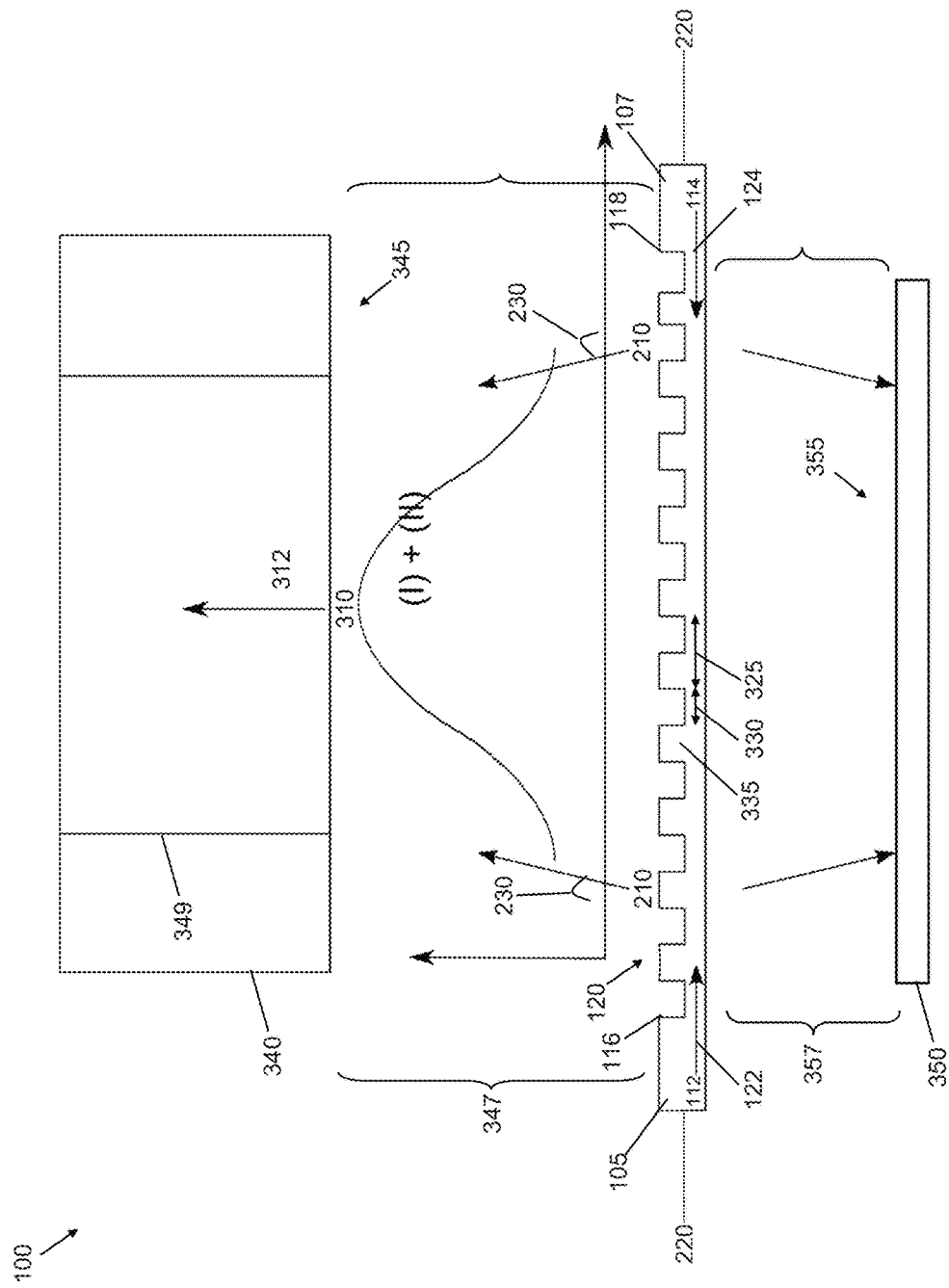
FIG. 3A illustrates a radiated field distribution curve for the example optical apparatus shown in FIG. 1 where the off-normal radiation angles are adjusted such that where the vertically projected optical signals have a single substantially Gaussian shaped field distribution (I+II)

As illustrated in FIG. 2, the individual optical signals 210 from the individual features of the grating coupler, can combine via optical interference, to produce a normally propagating light beam having a cosine shaped axial intensity profile (e.g., curve I+II in FIG. 2) across the grating coupler 120. However as illustrated in FIG. 3A, the grating coupler 120 can be configured to have a characteristic acute off-normal radiation angle 230 so as to produce a combined vertical propagation optical signal 310 with one single cosine shaped field intensity distribution (e.g., curve I+II in FIG. 3A). For instance, the vertically propagated signal 310 can have a single substantially Gaussian shaped field strength distribution (e.g., true Gaussian or near-Gaussian distributions) vertically centered above and below the grating coupler 120 and a direction 312 that is substantially perpendicular to the major plane 220.

One skilled in the art would understand how the off-normal radiation angle 230 would be selected depending upon the mode size of the optical fiber (or other device) that grating coupler 120 is to be vertically optically coupled to. E.g., the smaller the fiber mode size, the larger the angle 230 needed to reduce the field distribution, and, the larger the fiber mode size the smaller the angle 230 needed to increase the field distribution.

Based on the present disclosure, one of ordinary skill in the pertinent art would understand how to configure the grating coupler 120 with vertically emitted light distribution (e.g., with a desired off-normal radiation angle 230) by adjusting the period 325 and spacing 330 of a set of equally spaced ridged shaped grating elements 335 of the grating coupler 120. E.g., for a grating coupler 120 composed of silicon (e.g., refractive index equal to about 3.5 in the common optical telecommunication bands) and surrounded by a silicon dioxide cladding (e.g., refractive index equal to about 1.4), a period 325 of about 0.6 microns and spacing 330 of about 0.28 microns would provide an off-normal radiation angle 230 of about +3 and −3 degrees. E.g., a period 325 of about 0.6 microns and spacing 330 of about 0.24 microns would provide an off-normal radiation angle 230 of about +5 and −5 degrees, and, the light intensity profile (e.g., a Gaussian-shaped profile) across the end-face of a optical device 340 (e.g., fiber) a few microns above the surface of the coupler 120.

As further illustrated in FIG. 3A, embodiments of the apparatus 100 can further include an optical device 340 (e.g., an optical fiber) having an optical input-output face 345 (e.g., fiber end) located in a region 347 centered over the optical grating coupler 120. For instance, the optical device 340 configured as an optical fiber can have an optical core 349 whose face 345 is centered over the optical grating coupler 120. For instance, the optical device 340, e.g., configured as a laser, a photodiode, a photo-detector, a fiber array etc., can have a face 345 centered over the optical grating coupler 120.

The optical device 340 can be configured to receive the vertical propagation optical signal 310 from the optical grating coupler 120, or, to transmit a single mode optical signal to the region 347. For some embodiments, the apparatus 100 can be configured such that light can propagate in either vertical direction, e.g., from the optical device 340 to the optical grating coupler 120 or from the optical grating coupler 120 to the optical device 340.

The optical grating coupler is configured to produce the vertical propagation optical signal with a beam diameter and numerical aperture that maximizes optical coupling efficiency to a single mode size of an optical device, e.g., as indicated by maximum light intensity transferred between the grating coupler 120 and the optical device 340.

Embodiments of the optical grating coupler 120 can be configured such that waves of the acute off-normal vertically propagated optical signals 210 destructively interfere to form the single mode size propagation optical signal 310 perpendicularly off-set from the center of the grating coupler 120.

For instance, in some embodiments, when the optical device 340 has a single mode size diameter in a range from 3 to 15 microns and the optical grating coupler 120, composed of silicon and surrounded by a silicon oxide cladding, with equally spaced ridges elements 335 can have a periodicity (period 325) in a range from 0.4 to 0.2 microns and a spacing 330 in a range from 0.1 to 1.9 microns.

As also illustrated in FIG. 3A, embodiments of the apparatus 100 can further include a mirror 350 having a reflective surface 355 (e.g., a planar reflective surface of a metal mirror) facing and parallel to the major plane 220 of the optical grating coupler 120. As illustrated the reflective surface 355 of the mirror 350 can be located in a region 357 centered over the optical grating coupler 120.

Figure 3B:
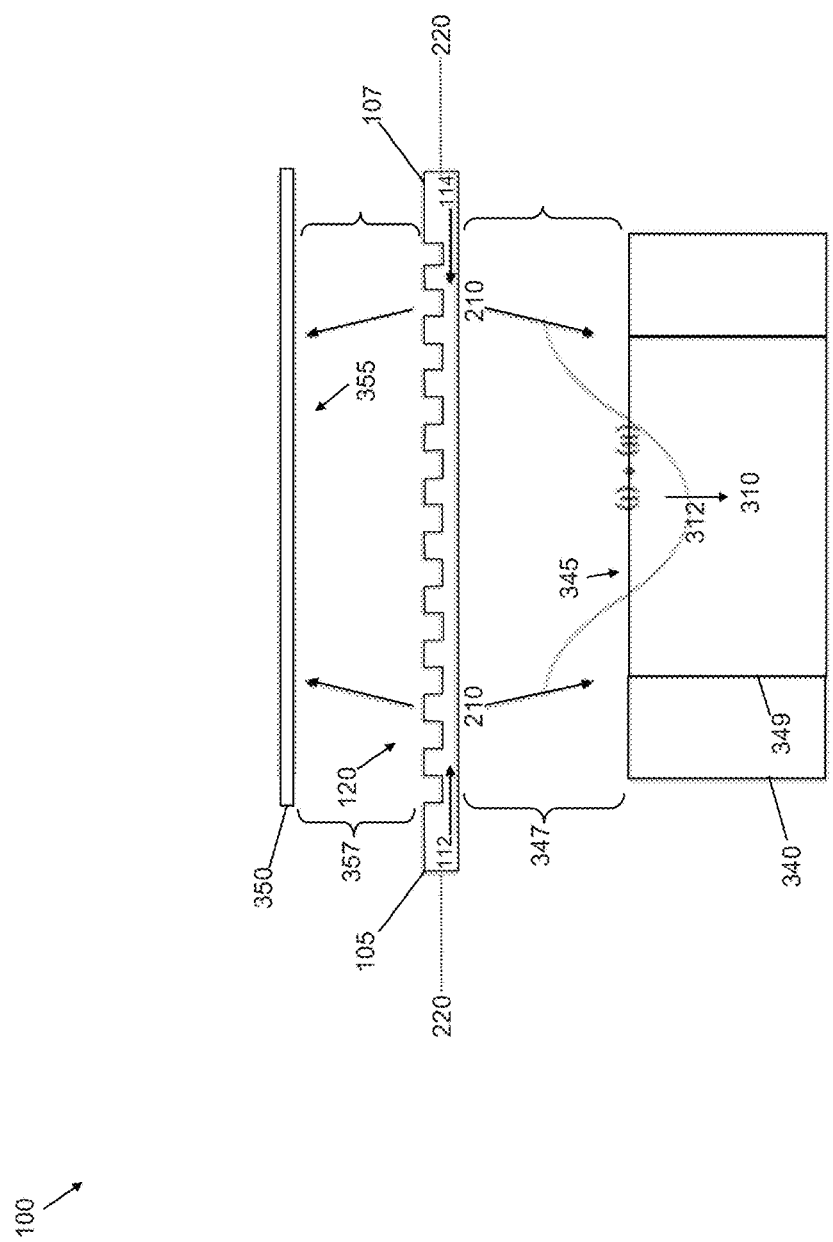
FIG. 3B presents a cross-sectional view of another optical apparatus embodiment of the disclosure similar to the optical apparatus depicted in FIGS. 1-3A.

As illustrated in FIG. 3B, in some embodiments the mirror 350 can located under the optical grating coupler 120 and the reflective surface 355 facing and parallel to the major plane 220 of the optical grating coupler 120 can be located in a region 357 centered under the optical grating coupler 120. In such embodiments the optical device 340 can be located over the optical grating coupler 120 with the optical input-output face 345 located in a region 347 centered under the optical grating coupler 120.

Figure 4:
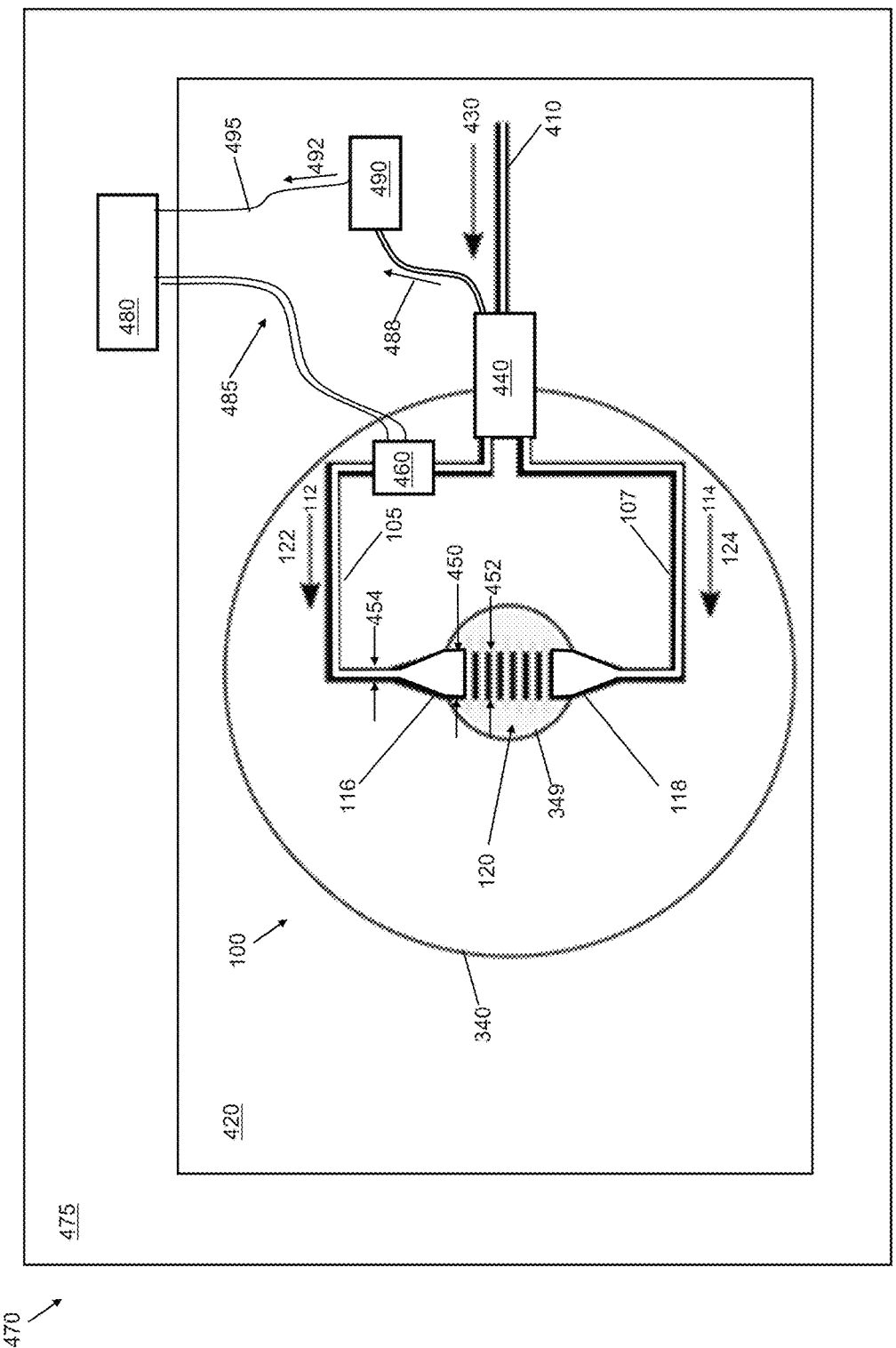
FIG. 4 presents an overhead a plan view of another example apparatus embodiment of the disclosure, similar to the apparatus depicted in FIG. 3B.

FIG. 4 presents an overhead a plan view of another example apparatus 100 embodiment of the disclosure, similar to the apparatus 100 depicted in FIG. 3B. As illustrated the core 349 of the optical fiber device 340 is centered under the optical grating coupler 120, the coupler 120 is configured as a one-dimensional grating, and, the dual waveguide arms 105, 107 are connected or optically coupled to the grating coupler 120.

In some embodiments, more than two waveguide arms can be coupled to the grating coupler 120, e.g., to provide further control over the shaping of the field distribution of the vertically propagated signal 310. For example, three or four or more waveguide arms can be connected or coupled to the optical grating coupler with each arm configured to carry an optical output (e.g., equal portions of a split optical signal) to the grating coupler. Similarly in some embodiments, e.g., to provide further shaping of the field distribution of the vertically propagated signal 310, two or more waveguide arms can be optically coupled to an optical grating coupler that is configured as a two-dimensional grating coupler.

As illustrated in FIG. 4, the two or more waveguide arms 105, 107 are coupled to a single waveguide 410 on a substrate 420 of the apparatus 100 (e.g., a photonic integrated circuit substrate such as a silicon chip substrate). The single waveguide 410 is configured to carry the split optical signal 430, that is, the signal that is split into the optical signal portions 112, 114. For embodiments where light is propagated from the optical device 340 to the optical grating coupler 120, the vertically propagated optical signal 310 is split into the optical signal portions 112, 114 and combined to form the optical signal 430.

As illustrated in FIG. 4, the apparatus 100 can further include a splitter/combiner device 440 located on the substrate 420 (e.g., an optical diplexer) and configured to optically couple the two or more waveguide arms 105, 107 with the single waveguide 410. Non-limiting examples of the splitter/combiner device 440 include mono- or bi-directional Y-splitters or multi-mode interference (MMI) couplers.

As illustrated in FIG. 4, in some embodiments, to facilitate optical coupling efficiency, for some embodiments, ends 116, 118 of the two or more waveguide arms 105, 107 can be tapered from a width 450 about equal to a width 452 of the optical grating coupler 120 (e.g., a width 452 of about 10 to 12 microns in some embodiments of a single mode fiber) to a width 454 of the non-taper portions of the waveguide arms 105, 107 (e.g., a width 454 of about 0.4 to 0.6 microns in some embodiments).

As illustrated in FIG. 4, some embodiments of the apparatus 100 further include an optical phase shifter 460 optically coupled to one of the waveguide arms (e.g., arm 105). The optical phase shifter 460 (e.g., a thermo-optic, liquid crystal, electro-optic effects, magneto-optic phase shifter) can be configured to adjust a phase of the portion of the split optical signal (e.g., signal 112) directed through the one waveguide arm 105, e.g., to facilitate optical coupling efficiency of light propagated from the grating coupler 120 to the optical device 340.

In some embodiments, when coupling light from the grating coupler 120 to an optical device 340 the phase shifter 460 can also be used to adjust or tune the position of the peak intensity distribution of the vertical propagation optical signal 310, e.g., with the single substantially Gaussian shaped field strength distribution, in a plane parallel to but off-set from the major plane 220. For instance, the optical phase shifter 460 can be configured to adjust the phase of the portion of the split optical signal such that the optical signal portions 112, 114 directed to the optical grating coupler 120 combine to produce the vertical propagation optical signal 310 with a single substantially Gaussian shaped field strength distribution having a peak intensity in a plane parallel to but perpendicularly off-set from the major plane 220.

For some embodiments of the apparatus 100 configured such that light can propagate from the optical device 340 to the optical grating coupler 120 and on to the waveguide arms 105, 107 the waveguide arms do no need to be coupled to a single waveguide arm, and the light couple to each waveguide arm can be used for different purposes or further manipulated in different ways. For instance, one waveguide arm can be coupled to a local oscillator to change the polarization of the light to one or S or P polarized light while the other waveguide arm carries the other of P or S polarized light.

As further illustrated, the optical apparatus 100 can be part of an optical system package 470, where the substrate 420 of the apparatus 100 is mounted to an optical system package support substrate 475 of the package 470. In some embodiments, a phase control module 480 is located on the package substrate 475 and the phase control module 480 is coupled via electrodes 485 on the substrate 420 to the optical phase shifter 460. One skilled in the pertinent art would understand how the phase control module 480 could be configured to adjust the phase shifter 460 so as to optimize optical coupling efficiency.

In some embodiments, the splitter/combiner 440 can be configured as a 2×2 splitter/combiner 440 (e.g., a 2×2 MMI coupler) and optical output 488 from a port of the 2×2 splitter/combiner 440 can monitored, e.g., via an optical sensor 490 to produce a monitor signal 492 that is transmitted (e.g., via electrical line 495) to the phase control module 480 to facilitate the phase control module 480 to control the phase shifter 460, e.g., as part of optimizing optical coupling efficiency.

Figure 5A:
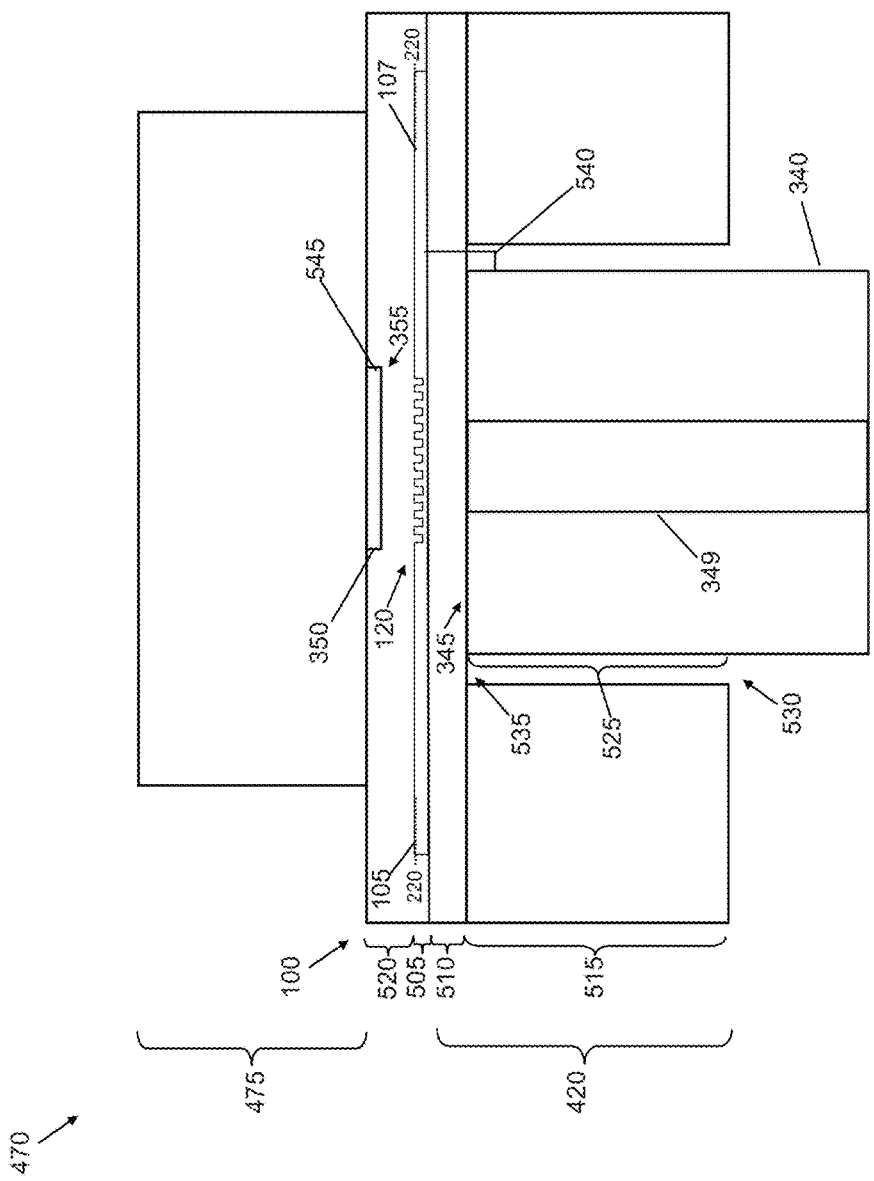
FIG. 5A presents a cross-sectional view of another optical apparatus embodiment of the disclosure, similar to the apparatus depicted in FIG. 3B.
Figure 5B:
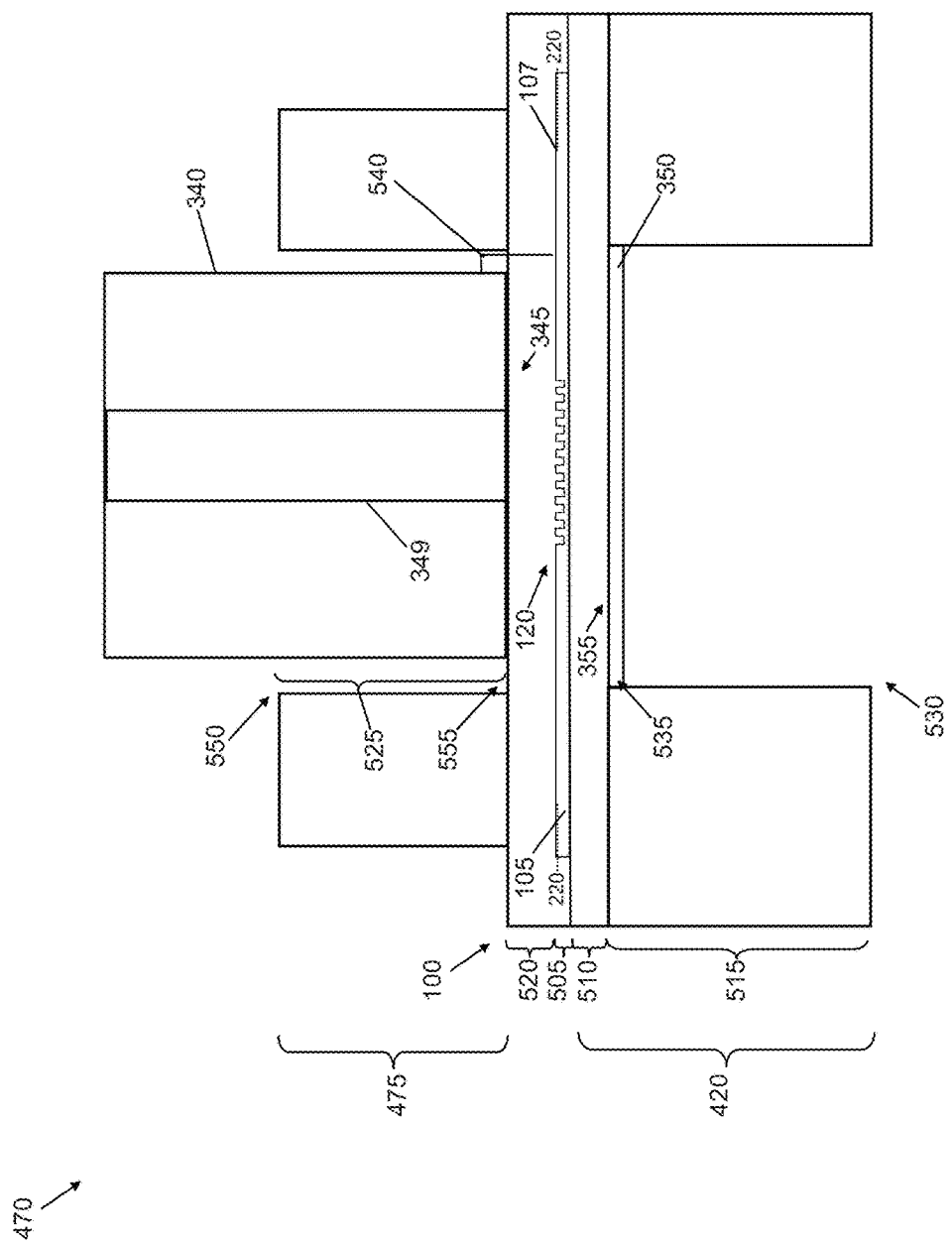
FIG. 5B presents a cross-sectional view of another optical apparatus embodiment of the disclosure, similar to the apparatus depicted in FIG. 3A.

FIGS. 5A and 5B present cross-sectional views of additional optical apparatus 100 embodiments of the disclosure, similar to the apparatuses depicted in FIGS. 3A, 3B and 4.

As illustrated in FIG. 5A, the two or more waveguide arms 105, 107 and the optical grating coupler 120 are located on a substrate 420 (e.g., photonic integrated circuit chip substrate) and the substrate 420 is mounted to an optical system package support substrate 475 (e.g., a silicon support substrate 475 of an optical system package 470). The waveguide arms 105, 107 and the optical grating coupler 120 can be part of a common optical layer 505 located on a cladding layer 510 (e.g., lower cladding layer) which in turn is located on a handle layer 515 of the substrate 420. For instance, in some embodiments the substrate 420 can be a silicon-on-insulator substrate where the handle layer 515 is a silicon layer, the cladding layer 510 is a silicon oxide layer and the optical layer 505 is an epitaxially grown silicon layer. In other embodiments, the optical layer 505 not necessarily an epitaxially grown silicon layer and may be composed of other optical material familiar to those skilled in the pertinent art.

As further illustrated in FIG. 5A, some apparatus embodiments can further include a second cladding layer 520 (e.g., upper cladding layer) located on the optical layer 505 and lower cladding layer 510, and, covering the two or more waveguide arms 105, 107 and the optical grating coupler 120. For instance, the second cladding layer 520 can be a silicon oxide layer deposited over the optical layer 505.

As further illustrated in FIG. 5A, in some embodiments, to facilitate a perpendicular mounting orientation, an end portion 525 of the optical device 340 can be mounted to the substrate 420 through an opening 530 formed in the substrate 420. For instance, the input-output face 345 of the optical device 340 can be located on a planar surface 535 of the lower cladding layer 510 exposed by forming an opening 530 in the handle layer 515. For instance, in some embodiments, the end portion 525 of the optical device 340 forms a substantially perpendicular angle 540 (e.g., 90 degrees±1 degree) with respect to the major plane 220 of the optical grating coupler 120.

As further illustrated in FIG. 5A some apparatus embodiments can further include a mirror 350 located on the opposite side of the optical device 340, e.g., to enhance optical coupling efficiency between the optical grating coupler 120 the optical device 340. In some embodiments the mirror 350 can includes a metal (e.g., Cu, Al, W), or multilayer dielectric materials, deposited in an opening 545 in the upper cladding layer 520. In some embodiments, mirror 350 can be embedded inside the upper cladding layer 520 when formed during the cladding deposition.

As illustrated in FIG. 5A for apparatus embodiments the optical device 340 can be located under the optical grating coupler 120, e.g., in an opening 530 formed in the substrate 420, and, the mirror can be embedded in an opening 545 of the upper cladding layer 520. In other embodiments, such as shown in FIG. 5B, again to facilitate having a perpendicular mounting orientation with the substantially perpendicular angle 540, the end portion 525 of the optical device 340 can be mounted to the substrate 420 through an opening 550 formed in the (e.g., silicon) support substrate 475. For instance, the input-output face 345 of the optical device 340 can be located on a planar surface 555 of the upper cladding layer 520 exposed by forming the opening 550. Such embodiment can include a mirror 350 located on the opposite side of the optical device 340, e.g., located in an opening 530 of the substrate 420, with the mirror material deposited on a planar surface 535 of the lower cladding layer 510.

Embodiments of the apparatus 100 could be configured couple light at a wavelength in any of the common optical telecommunication bands, including the Original (e.g., about 1260 to about 1360 nm), Extended (e.g., about 1360 to about 1460 nm), Short (e.g., about 1460 to about 1530 nm), Conventional (C-band, e.g., about 1530 to about 1565 nm), Long (from e.g., 1565 to about 1625 nm) or Ultralong (e.g., about 1625 to about 1675 nm) bands.

Figure 6:
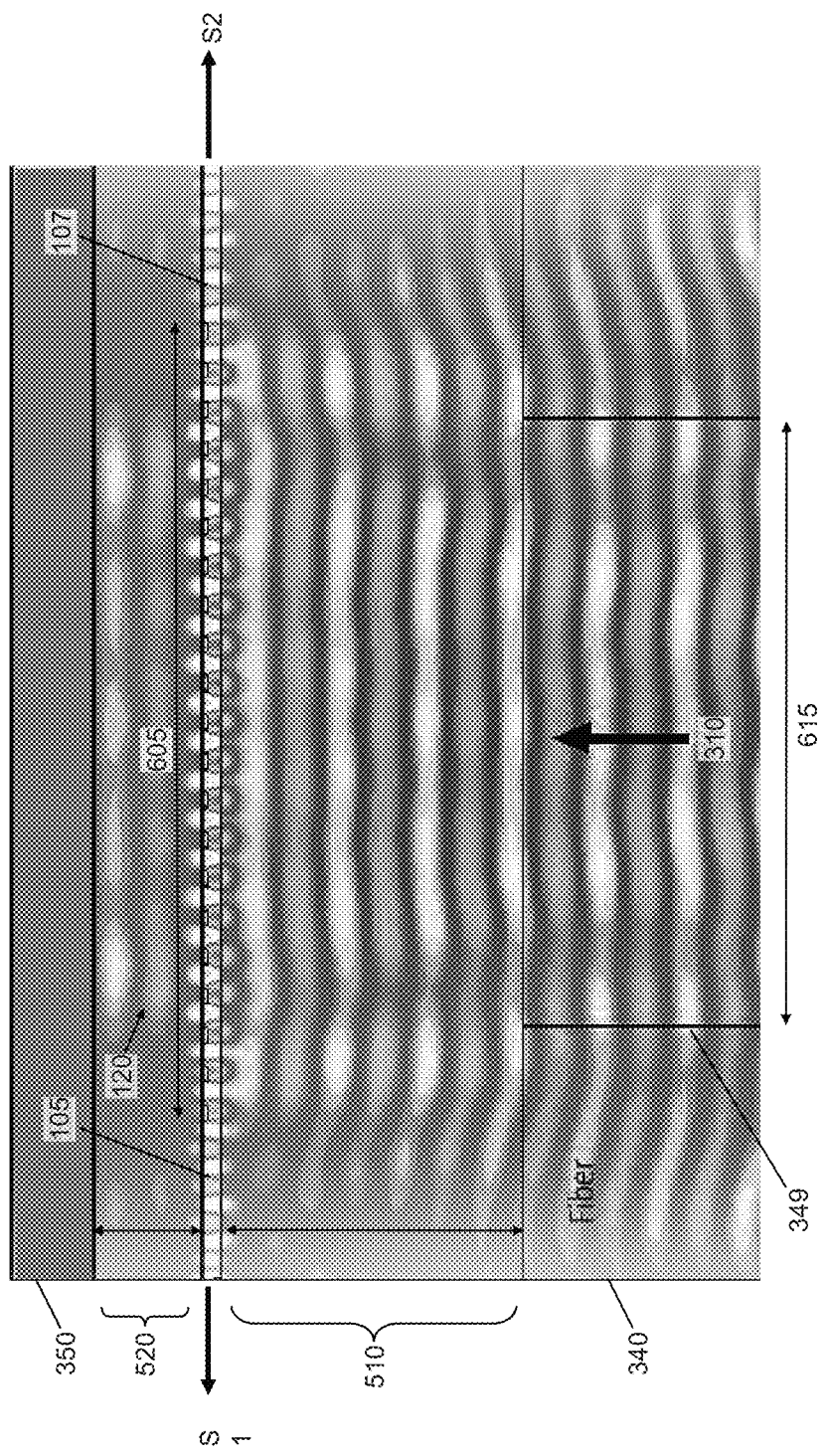
FIG. 6 presents field distribution contours for a simulation of an apparatus similar to the apparatus shown in FIG. 3B or 5A.

FIG. 6 presents exemplary field distribution contours for a simulated apparatus embodiment of the disclosure, similar to the apparatuses shown in FIG. 3B or 5A. The field distribution contours were simulated using a computer program (e.g., CST Microwave Studio based on the Finite Integration Technique). The simulation assumed a silicon optical grating coupler 120 of the disclosure having a width 605 of 12 microns surrounded by silicon oxide cladding layers 510, 520 of thickness 610, 612 equal to 4.5 an 1.5 microns, respectively. The optical device 340 was assumed to be an optical fiber having a core 349 diameter 615 of about 9 microns, and a totally reflective mirror 350 was assumed to be located on the opposite side of the optical device on, e.g., the upper cladding layer 520. The optical grating coupler was assumed to be a 1 dimensional grating having a period (e.g., period 325 in FIG. 3A) of 0.574 microns and spacing (e.g., spacing 330 in FIG. 3A) of 0.227 microns. For the simulation, the optical device 340 was assumed to propagate single mode light 310 of frequencies in the range from 190.4 THz to 192.4 THz to the optical grating coupler 120. As illustrated the light 320 to the grating coupler 120 are equally coupled, as signified by the scattering parameters S1, S2, to the waveguide arms 105, 107.

Figure 7:
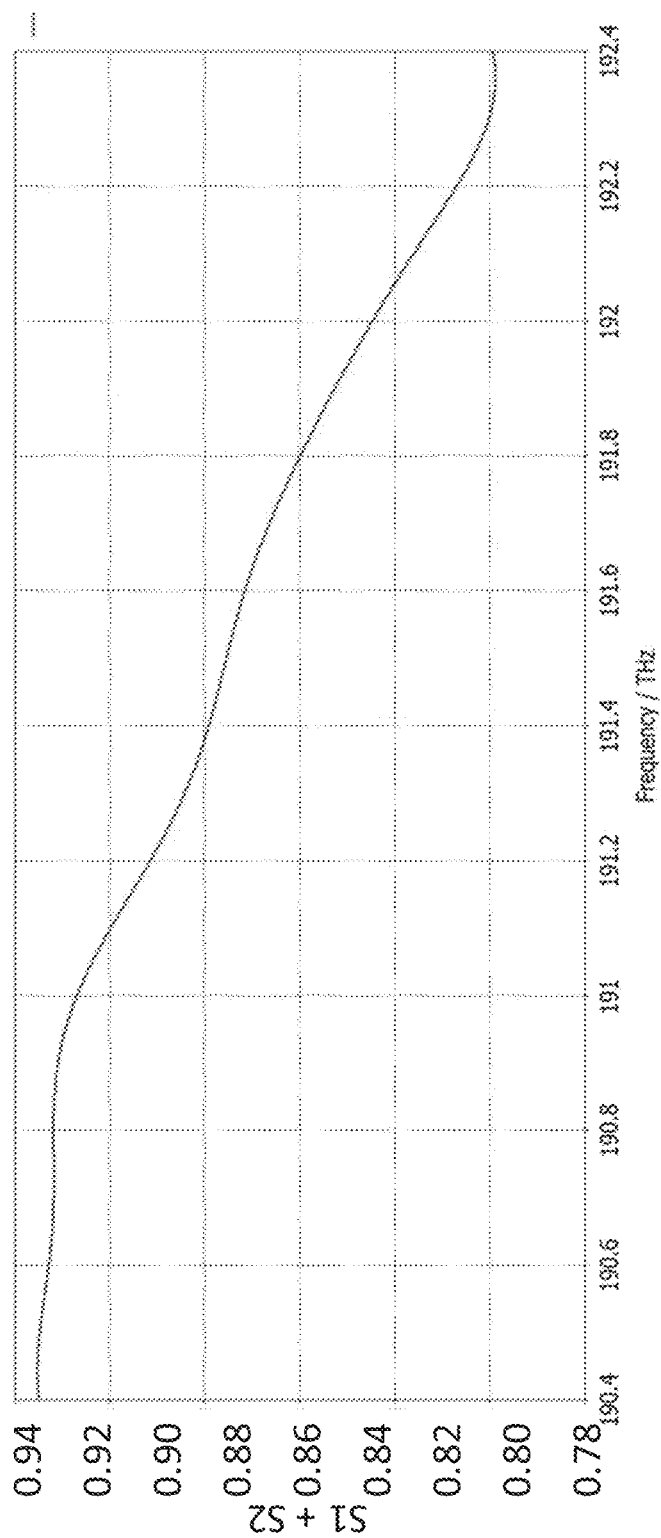
FIG. 7 presents optical coupling efficiency as a function of optical frequency for the simulation shown in FIG. 6.

FIG. 7 presents exemplary optical coupling efficiency as a function of optical frequency for the simulated apparatus embodiment shown in FIG. 6. The vertical axis in FIG. 7 is the sum of the scattering parameters (S1+S2) which is equivalent to the total optical coupling efficiency of light coupled between to optical device 340 to a single waveguide (e.g., waveguide 410 in FIG. 4) that the waveguide arms 105, 107 are coupled to. As illustrated, about 93 percent coupling efficiency is possible over the frequency range about 190.4 to 191 THz (e.g., about 1574 to 1570 nm).

Another embodiment of the disclosure is a method that includes fabricating a vertical optical coupling apparatus such as any of the example apparatuses 100 described in the context of FIGS. 1-7. FIGS. 8-14 present cross-sectional views of the optical apparatus 100 at different stages of fabrication in accordance with embodiments of the disclosed method.

Figure 8:
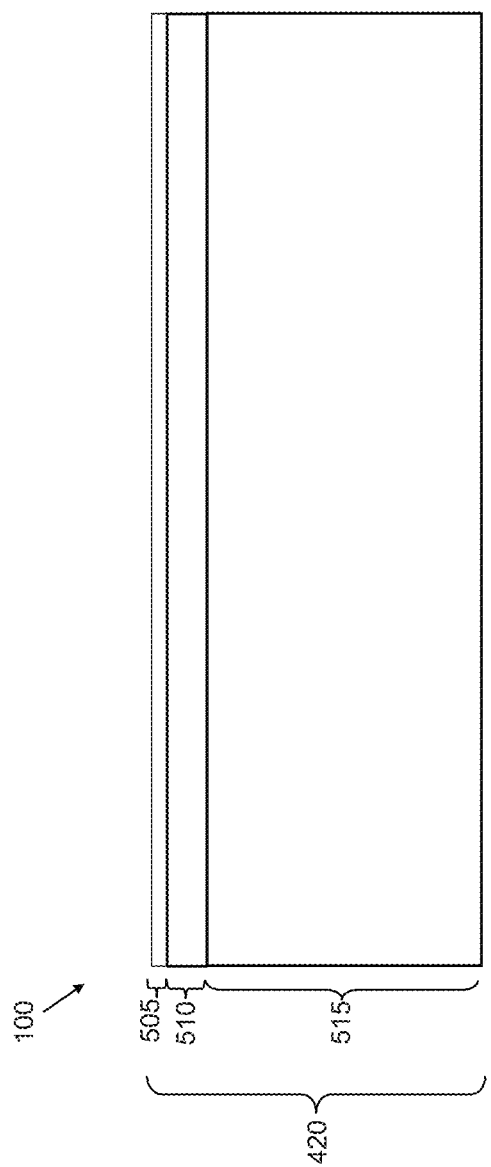
FIG. 8 presents a cross-sectional view of the partially completed optical apparatus at one stage of fabrication in accordance with one embodiment of a disclosed method of fabrication.

As illustrated in FIG. 8, fabricating the apparatus 100 can include providing a substrate 420 and providing an optical layer 505 on the substrate 420. For instance as illustrated the substrate 420 (e.g., a silicon-on-insulator substrate) can include a handle layer 515 (e.g., a bulk silicon layer) and a first cladding layer 510 (e.g., a buried silicon oxide layer) on the handle layer 515 with the optical layer 510 (e.g., an optical silicon layer) located on the first cladding layer 510. E.g., in some embodiments, has a silicon optical layer 220 and buried oxide layer 230 located on a bulk silicon layer 240, e.g., as illustrated in FIGS. 2A-2B). In other embodiments, optical layer 510 can be provide as part providing a silicon-on-insulator substrate, while in other embodiments, the optical layer can be deposited on the substrate using procedure familiar to those in the pertinent art.

Figure 9:
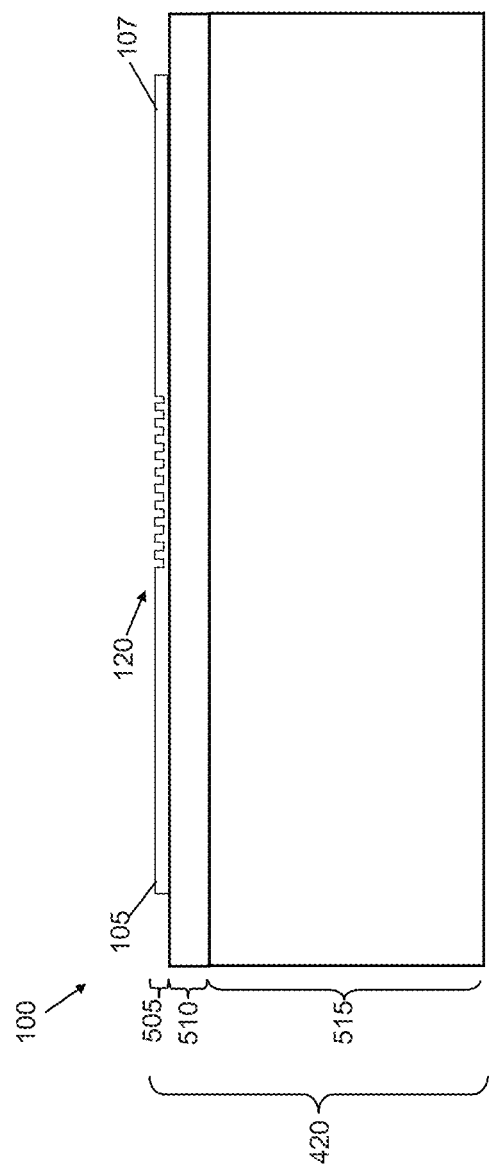
FIG. 9 presents a cross-sectional view of the partially completed optical apparatus at another stage of fabrication in accordance with one embodiment of the disclosed method.

As illustrated in FIG. 9, fabricating the apparatus 100 can include patterning the optical layer 505 to form an optical grating coupler 120 and two or more waveguide arms 105, 107 optically coupled to the optical grating coupler 120. Patterning can include any conventional lithographic and etching procedures familiar to those skilled in the pertinent art to remove portions of the optical layer 505 laying outside of the optical coupler 120, waveguide arms 105, 107 or other optical components of the apparatus 100.

As disclosed in the context of FIGS. 1-7, in some embodiments, the optical grating coupler 120 can be connected receive light 112, 114 from each of the waveguide arms 105, 107 and form diffraction pattern therefrom such that a principal maximum of one of the diffraction patterns overlaps with a principal maximum of another of the diffraction patterns on the optical input-output face of the optical device, the principal maxima of the one and another of the diffraction patterns being directed in different directions.

As disclosed in the context of FIGS. 1-7, in some embodiments, the optical grating coupler 120 can be configured to produce a vertical propagation optical signal 310 in a region above and below a major plane 220 of the optical grating coupler 120. As disclosed in the context of FIGS. 1-7, the two or more waveguide arms 105, 107 are each configured to couple equal portions (e.g., light portions 112, 114) of a split optical signal 410 with the optical grating coupler 120, where each of the portions of the split optical signal 112, 114 when directed to the optical grating coupler 120, produce vertical propagation optical signals 210 with an acute off-normal radiation angle 230 relative to the major plane 220 of the optical grating coupler 120.

Figure 10:
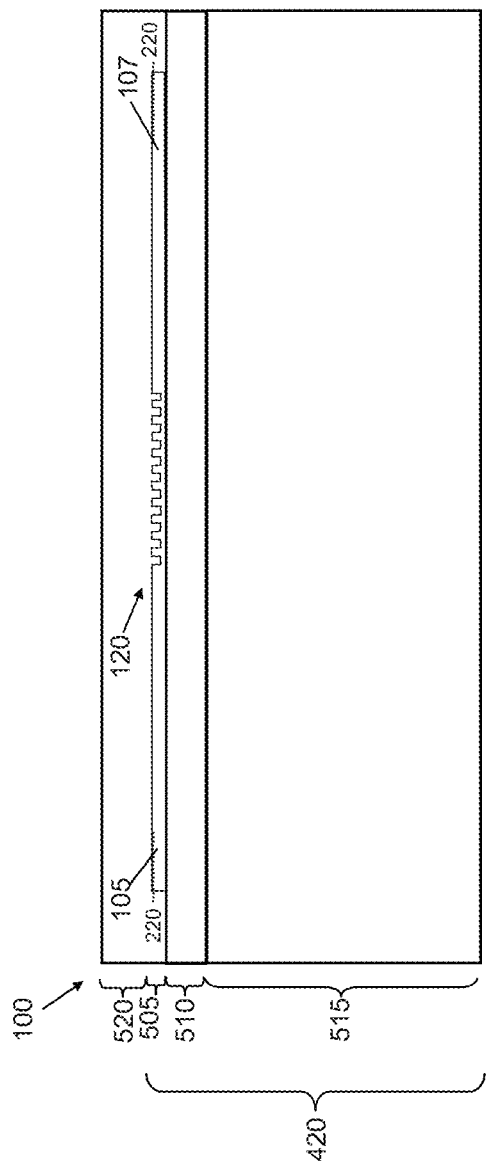
FIG. 10 presents a cross-sectional view of the partially completed optical apparatus at another stage of fabrication in accordance with one embodiment of the disclosed method.

As illustrated in FIG. 10, fabricating the apparatus 100 can include depositing a second cladding layer 520 on the optical grating coupler 120 and the two or more waveguide arms 105, 107.

Figure 11:
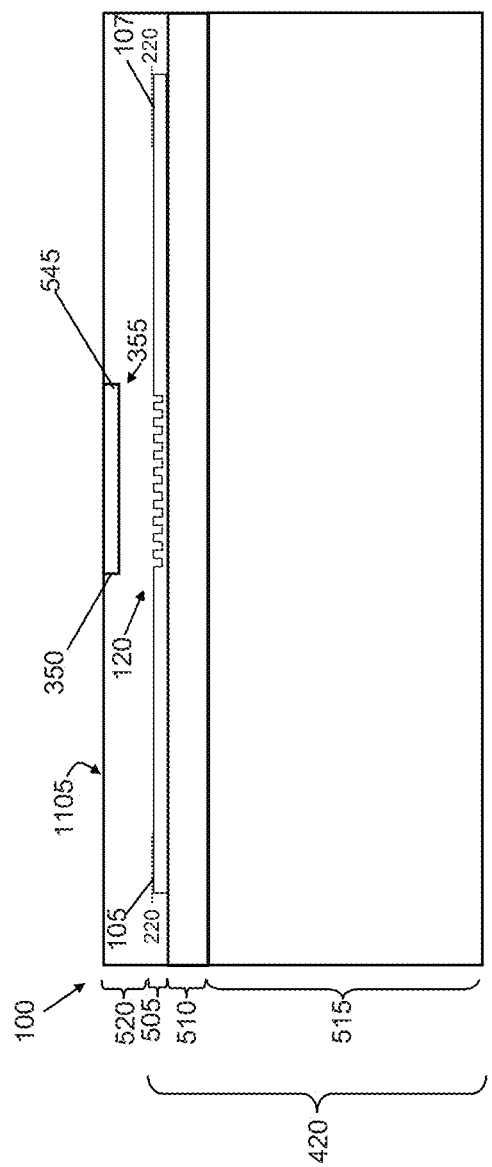
FIG. 11 presents a cross-sectional view of the partially completed optical apparatus at another stage of fabrication in accordance with one embodiment of the disclosed method.

As illustrated in FIG. 11, in some method embodiments, fabricating the apparatus 100 can include forming an opening 545 in the second cladding layer 520 and depositing a reflective material in the opening of the second cladding layer to form a mirror 350 having a planar reflective surface 355 facing, and parallel to, the major plane 220 of the optical grating coupler 120. Alternatively, in some embodiments, the mirror 350 can be deposited on outer surface 1105 of the upper cladding layer 520 or can be deposited during the back-end-of-line processes in which case the mirror 350 can be embedded inside the upper cladding 520.

Conventional lithographic and etching procedures familiar to those skilled in the pertinent art can be used to form the opening 545 and the reflective material can be a metal layer or multi-layered dielectric materials deposited via physical or vapor deposition, electro-deposition, electroless or similar process familiar to one skilled in the pertinent art. In some embodiments, forming the opening and depositing the reflective material can be integrated with conventional fabrication steps to form vias or landing pads, e.g., as part of forming electrical connections to control circuitry of the apparatus.

Figure 12:
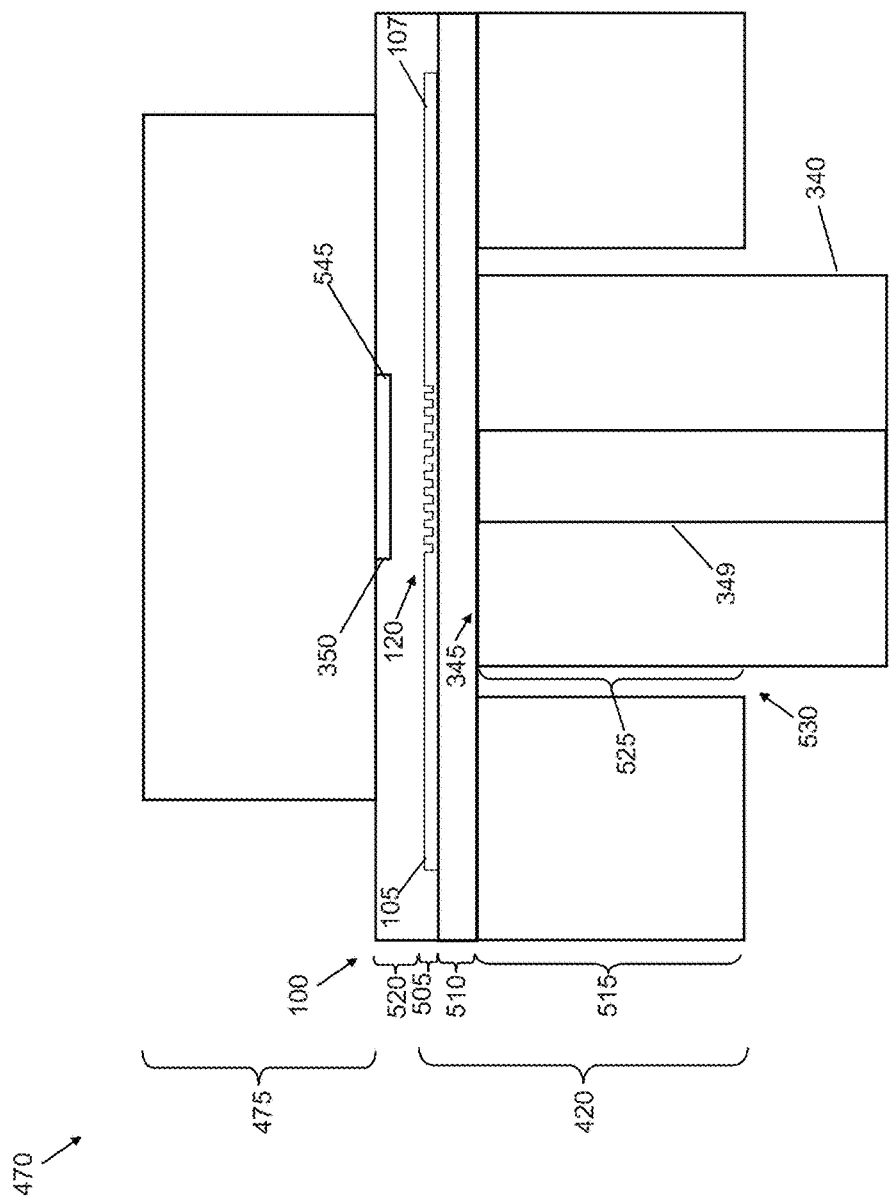
FIG. 12 presents a cross-sectional view of the partially completed optical apparatus at another stage of fabrication in accordance with one embodiment of the disclosed method.

As illustrated in FIG. 12, in some such embodiments fabricating the apparatus 100 can also include, e.g., using conventional lithographic and etching procedures, forming an opening 530 in the substrate 420 and positioning an optical input-output 345 of an optical device 340 in the opening 530 of the substrate 420, where the optical input-output 345 is located in a region (e.g., region 347, FIG. 3B) centered under the optical grating coupler 120, and, the optical device 340 can be configured to receive the vertical propagation optical signal 310 from the optical grating coupler 120, or, to transmit a single mode optical signal to the region (e.g., region 347, FIG. 3B).

Figure 13:
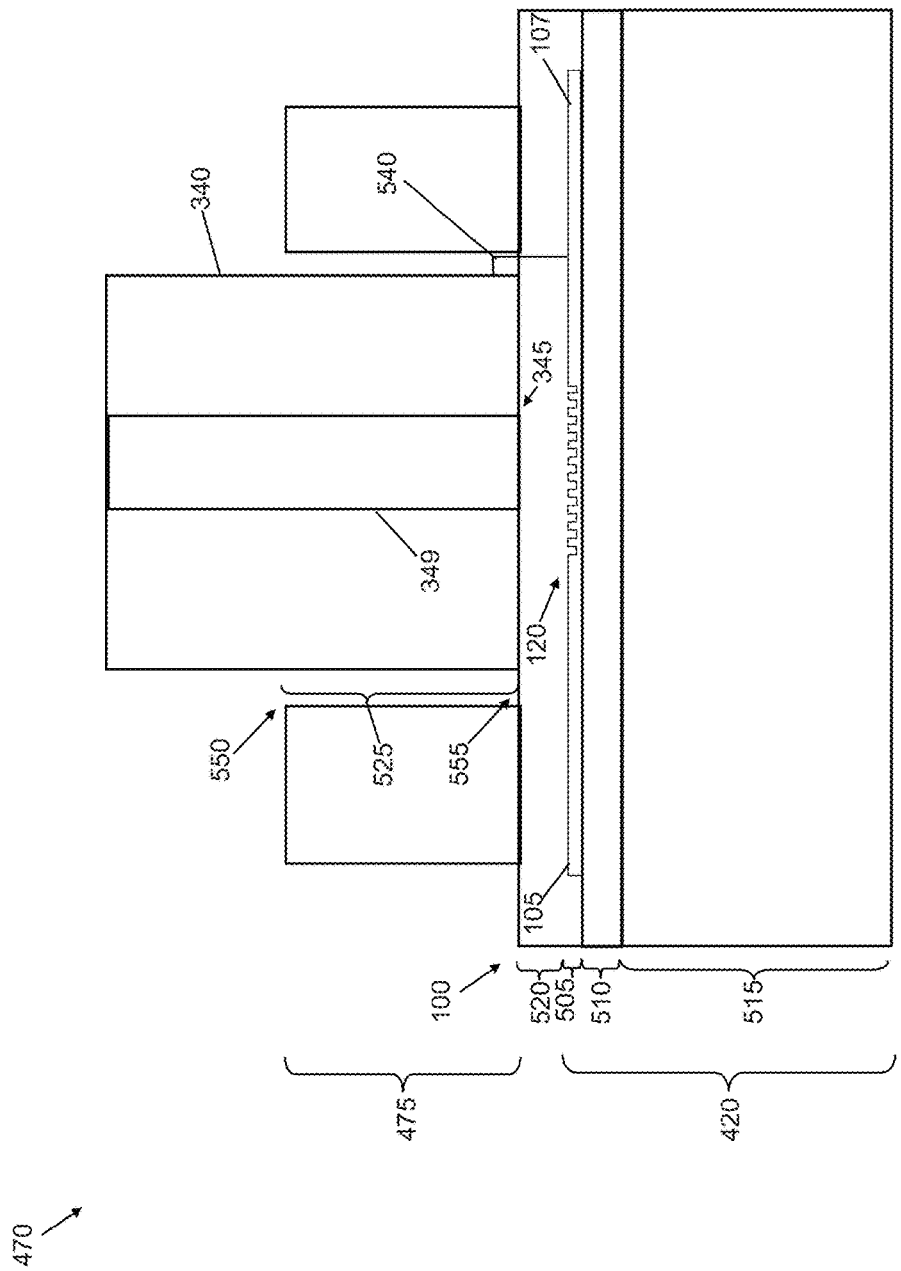
FIG. 13 presents a cross-sectional view of the partially completed optical apparatus at another stage of fabrication in accordance with one embodiment of the disclosed method.

As illustrated in FIGS. 12 and 13, in some method embodiments, fabricating the apparatus 100 can include mounting an optical system package support substrate 475 to the substrate 420, e.g., as part of fabricating an optical system package 470.

As illustrated in FIG. 13, some such embodiments include, e.g., using conventional lithographic and etching procedures, forming an opening 550 in the optical system package support substrate 475 and positioning an optical input-output 345 of an optical device 340 in the opening 550 of the optical system package support substrate 475. The optical input-output 345 is located in a region (e.g., region 347, FIG. 3A) centered over the optical grating coupler 120, and, the optical device 340 can be configured to receive the vertical propagation optical signal 310 from the optical grating coupler 120, or, transmit a single mode optical signal to the region (e.g., region 347, FIG. 3A).

Figure 14:
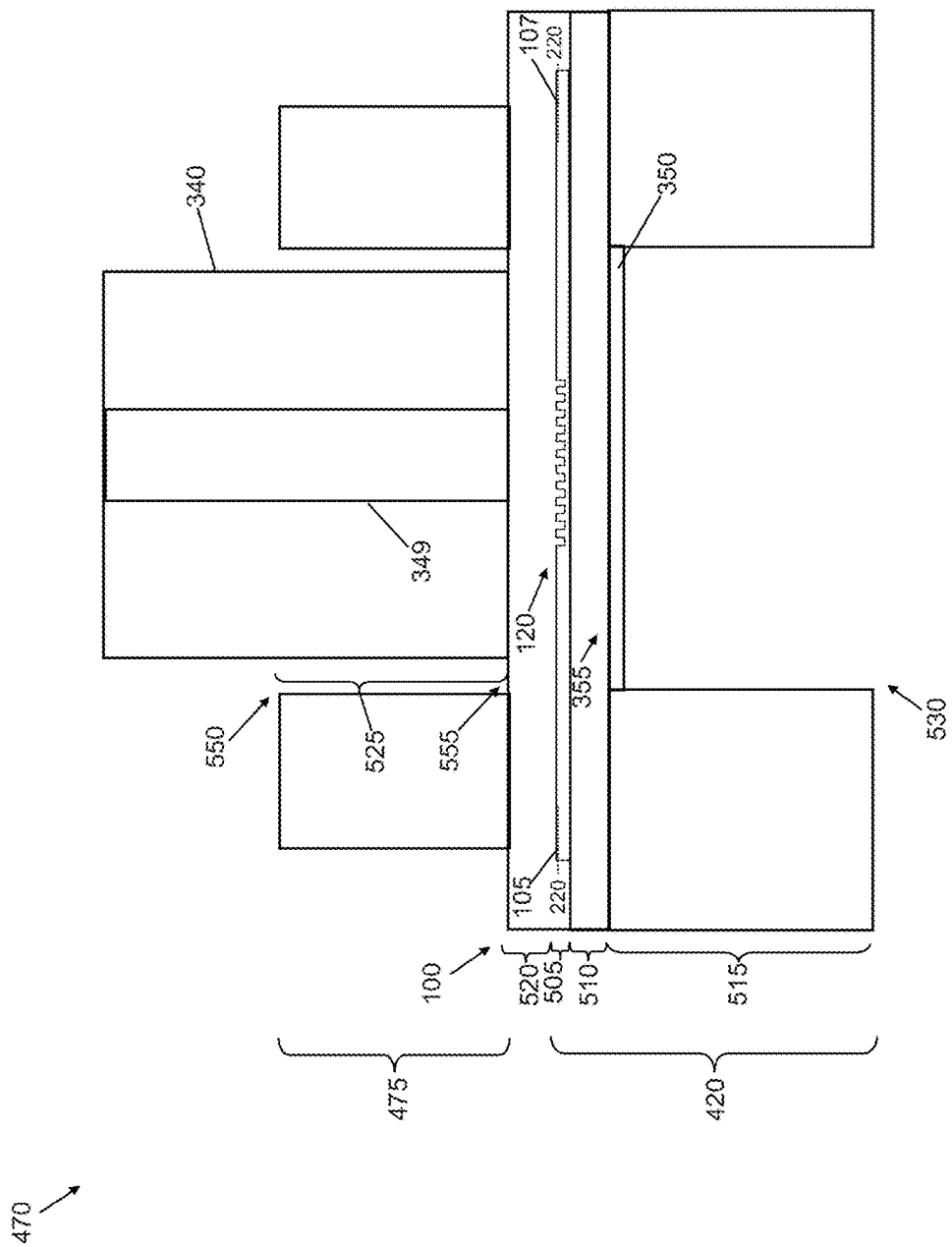
FIG. 14 presents a cross-sectional view of the partially completed optical apparatus at another stage of fabrication in accordance with one embodiment of the disclosed method.

As illustrated in FIG. 14, some such embodiments, further include, e.g., using the conventional procedures described in the context of FIG. 12, form an opening 530 in the substrate 420 and depositing a reflective material in the opening of the substrate to form a mirror 350 having a planar reflective surface 355 facing and parallel to the major plane of the optical grating coupler.

Although the present disclosure has been described in detail, those skilled in the art should understand that they can make various changes, substitutions and alterations herein without departing from the scope of the invention.

What is claimed is:

1. An optical apparatus, comprising:
an optical device having an optical input-output face;
at least two planar waveguide arms being located on a substrate;
an optical splitter being located on the substrate and having an optical input and a plurality of optical outputs, each optical output being optically connected to a corresponding one of the planar waveguide arms; and
an optical grating coupler being located on the substrate such that the planar waveguide arms transmit light to different end portions of the optical grating coupler such that the optical grating coupler forms diffraction patterns from the light transmitted by different ones of the waveguide arms such that a principal maximum of one of the diffraction patterns overlaps with a principal maximum of another of the diffraction patterns on the optical input-output face of the optical device, the principal maxima of the one and another of the diffraction patterns being directed in different directions.

2. The optical apparatus of claim 1, wherein a first of the planar waveguide arms is configured to propagate the light along the optical grating coupler in an opposite direction than a second of the planar waveguide arms.

3. The optical apparatus of claim 1, wherein the overlapping principal maxima are first order principal maxima of the one and another of the diffraction patterns.

4. The optical apparatus of claim 1, wherein only one principal maximum of the one and another of the diffraction patterns is incident on the optical input-output face of the optical device.

5. The optical apparatus of claim 1, wherein the overlapping principal maxima has a peak at or near a center of the optical input-output face.

6. The apparatus of claim 1, wherein the diffraction patterns combine to form an intensity pattern with one peak on the optical input-output face of the optical device.

7. The apparatus of claim 1, wherein the diffraction patterns combine to form an intensity pattern with a single substantially Gaussian shaped field strength distribution centered above and below the optical grating coupler.

8. The apparatus of claim 1, wherein the optical device is an optical fiber and the optical input-output face is an end of the fiber.

9. The apparatus of claim 1, wherein the diffraction patterns combine to form an intensity pattern with a shape and numerical aperture that maximizes optical coupling efficiency to a single mode size of the optical device.

10. The apparatus of claim 1, wherein the optical device has a single mode size diameter in a range from 3 to 15 microns and the optical grating coupler, composed of silicon and surrounded by a silicon oxide cladding, includes a set of equally spaced ridges across one dimension of the substrate, wherein the ridges has a periodicity in a range from 0.4 to 2.0 microns and a spacing in a range from 0.1 to 1.9 microns.

11. The apparatus of claim 1, further including an optical phase shifter optically coupled to one of the waveguide arms, the optical phase shifter configured to adjust a phase of the portion of the optical output directed through the one waveguide arm.

12. The apparatus of claim 1, further including an optical phase shifter optically coupled to one of the waveguide arms, the optical phase shifter configured to adjust the phase of the portion of the optical output directed through the one waveguide arm such that the optical output portions directed to the optical grating coupler combine to produce the diffraction patterns with an intensity pattern with a single substantially Gaussian shaped field strength distribution having a peak intensity in a plane parallel to but perpendicularly off-set from a major plane of the optical grating coupler.

13. The apparatus of 1, further including a phase control module located on the optical system package substrate and coupled via electrodes on the substrate to an optical phase shifter located on the substrate and optically coupled to one of the waveguide arms.

14. The apparatus of claim 1, wherein the substrate is a photonic integrated circuit substrate mounted to an optical system package support substrate.

* * * * *